(12) United States Patent
Kalman et al.

(10) Patent No.: US 9,560,039 B2
(45) Date of Patent: Jan. 31, 2017

(54) CONTROLLED DISCOVERY OF SAN-ATTACHED SCSI DEVICES AND ACCESS CONTROL VIA LOGIN AUTHENTICATION

(71) Applicant: PMC-Sierra US, Inc., Sunnyvale, CA (US)

(72) Inventors: Dean Kalman, Durham, NC (US); Ken Sandars, Sandringham (AU); Brett Dolecheck, Durham, NC (US); Mike Reyero, Keller, TX (US)

(73) Assignee: Microsemi Storage Solutions (U.S.), Inc., Aliso Viejo, CA (US)

(*) Notice: Subject to any disclaimer, the term of this patent is extended or adjusted under 35 U.S.C. 154(b) by 482 days.

(21) Appl. No.: 14/090,880

(22) Filed: Nov. 26, 2013

(65) Prior Publication Data

US 2014/0090043 A1  Mar. 27, 2014

Related U.S. Application Data

(63) Continuation of application No. 12/053,228, filed on Mar. 21, 2008, now Pat. No. 8,627,418.

(60) Provisional application No. 60/896,809, filed on Mar. 23, 2007.

(51) Int. Cl.
*H04L 29/00* (2006.01)
*H04L 29/06* (2006.01)
*G06F 21/80* (2013.01)
*H04L 29/08* (2006.01)

(52) U.S. Cl.
CPC .......... *H04L 63/083* (2013.01); *G06F 21/805* (2013.01); *H04L 67/1097* (2013.01)

(58) Field of Classification Search
CPC ... G06F 21/805; H04L 63/083; H04L 67/1097
See application file for complete search history.

(56) References Cited

U.S. PATENT DOCUMENTS

| | | | |
|---|---|---|---|
| 7,188,225 B1* | 3/2007 | Therene | G06F 11/1441 711/112 |
| 2003/0149869 A1* | 8/2003 | Gleichauf | H04L 45/50 713/153 |
| 2005/0091333 A1* | 4/2005 | Kobayashi | H04L 29/12169 709/212 |
| 2005/0193181 A1* | 9/2005 | Kaneda | G06F 3/0622 711/162 |
| 2005/0216668 A1* | 9/2005 | Kobayashi | G06F 9/4416 711/118 |
| 2005/0216767 A1* | 9/2005 | Mitsuoka | H04L 67/1097 726/5 |

(Continued)

OTHER PUBLICATIONS

Microsoft, "Manage iSCSI Security" Aug. 22, 2005, pp. 1-2.*

*Primary Examiner* — Michael Pyzocha
(74) *Attorney, Agent, or Firm* — Martine Penilla Group, LLP

(57) ABSTRACT

A method for accessing data in a storage area network is provided. The method initiates with receiving a request for a list of targets on the storage area network. All the targets on the storage area network are exposed to the requestor and authentication requiring a password is requested from the requestor to grant access to the targets on the storage are network. Access to the targets is granted if the password is acceptable, and access to the targets is refused if the password is unacceptable.

20 Claims, 5 Drawing Sheets

(56) References Cited

U.S. PATENT DOCUMENTS

| | | | |
|---|---|---|---|
| 2006/0053438 A1* | 3/2006 | Miyazawa | H04N 21/43622 725/25 |
| 2006/0064560 A1* | 3/2006 | Mizuno | G06F 21/805 711/164 |
| 2006/0155837 A1* | 7/2006 | Kobayashi | H04L 67/1097 709/223 |
| 2006/0174003 A1* | 8/2006 | Wilson | H04L 63/083 709/225 |
| 2006/0221985 A1* | 10/2006 | Mishra | H04L 63/205 370/401 |
| 2007/0038749 A1* | 2/2007 | Noya | G06F 3/0607 709/226 |
| 2007/0143583 A1* | 6/2007 | Cors | G06F 3/0605 713/1 |
| 2007/0143611 A1* | 6/2007 | Arroyo | H04L 63/0428 713/171 |
| 2008/0005565 A1* | 1/2008 | Shiga | H04L 63/0846 713/171 |
| 2008/0209196 A1* | 8/2008 | Hernandez | G06F 9/4416 713/2 |
| 2009/0046858 A1* | 2/2009 | Iyer | G06F 21/85 380/259 |
| 2009/0222896 A1* | 9/2009 | Ichikawa | G06F 21/575 726/6 |

* cited by examiner

CONTROLLED DISCOVERY OF SAN-ATTACHED SCSI DEVICES AND ACCESS CONTROL VIA LOGIN AUTHENTICATION

CLAIM OF PRIORITY

This patent application is a continuation of and claims the benefit of and priority, under 35 U.S.C. §120, to U.S. application Ser. No. 12/053,228, filed on Mar. 21, 2008, and titled "Controlled Discovery of SAN-Attached SCSI Devices and Access Control Via Login Authentication", which claims the benefit of and priority, under 35 U.S.C. §119(e), to U.S. Provisional Application No. 60/896,809, filed Mar. 23, 2007, and titled "Controlled Discovery of SAN-Attached SCSI Devices and Access Control Via Login Authentication", all of which are incorporated by reference herein in their entirety for all purposes.

BACKGROUND

Storage routers allow access to logical units via a mapping mechanism. Under this technique, the client's identification is used to determine whether access to a particular logical unit may be granted. This mapping scheme is implemented for each command from a particular client. The mapping technique is required since a single target was provided to a client logging into the system. The target housed zero or more logical units that the client was allowed access to. As the login permitted access to the storage appliance but did not control access to the logical units, the mapping technique was implemented.

Access control using mapping techniques requires the storage appliance to have knowledge of the identity of all clients. As the number of logical units and clients increases, the mapping becomes more complex and less efficient, especially when applied on a per command basis.

As a result, there is a need to solve the problems of the prior art to provide for a more efficient access control technique for a storage appliance.

SUMMARY

Broadly speaking, various embodiments described in the present disclosure fill these needs by providing a method and apparatus for efficiently accessing data on a storage area network. It should be appreciated that the various embodiments can be implemented in numerous ways, including as a process, an apparatus, a system, or a device. The various embodiments are described below.

In one embodiment, a method for accessing data in a storage area network is to provided. The method initiates with receiving a request for a list of targets on the storage area network. All the targets on the storage area network are exposed to the requestor and authentication requiring a password is requested from the requestor to grant access to the targets on the storage are network. Access to the targets is granted if the password is acceptable, and access to the targets is refused if the password is unacceptable.

Other aspects and advantages of embodiments described herein will become apparent from the following detailed description, taken in conjunction with the accompanying drawings, illustrating by way of example several principles.

BRIEF DESCRIPTION OF THE DRAWINGS

Several embodiments described in the present disclosure will be readily understood by the following detailed description in conjunction with the accompanying drawings, and like reference numerals designate like structural elements.

DETAILED DESCRIPTION

Figure 1:
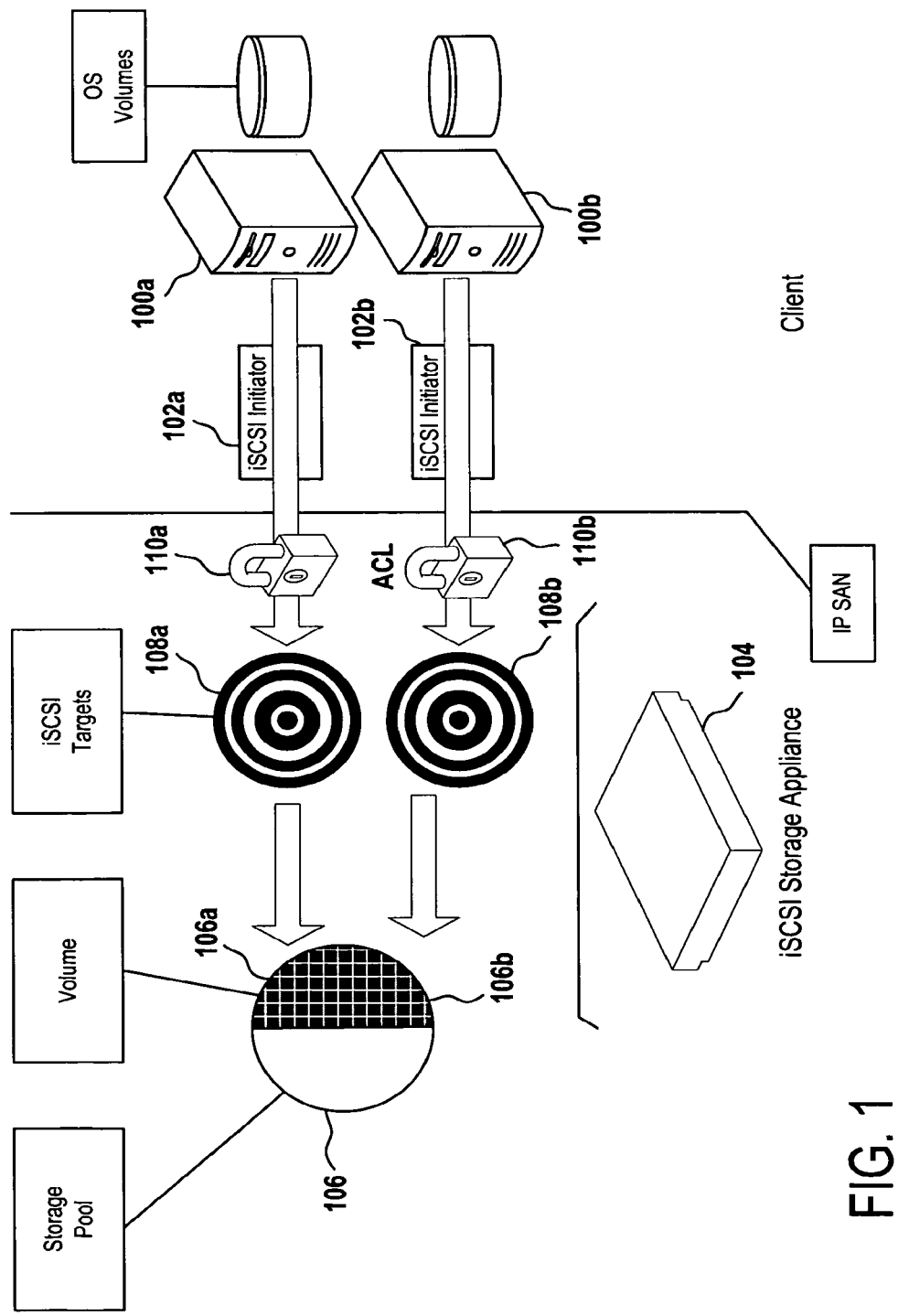
FIG. 1 is a simplified schematic diagram illustrating iSCSI access control in accordance with one embodiment described in the present disclosure.

Several embodiments described herein include an apparatus and method for providing a controlled discovery mechanism that reduces the workload of a storage client. It will be obvious, however, to one skilled in the art, that some embodiments described herein may be practiced without some or all of these specific details. In other instances, well known process operations have not been described in detail in order not to unnecessarily obscure various embodiments described in the present disclosure.

Conventional computing devices, such as computer work stations, generally access data through network interconnections to storage area networks. Network interconnects enable access for a large number of computing devices to data storage on a remote network server. The remote network server provides file systems structure, access control, and other miscellaneous capabilities that include the network interface. Access to data of the storage area network is through network protocols that the server must translate into low level requests to the storage device. A work station with access to the server must translate its file system protocols into network protocols that are used to communicate with the server. Consequently, from the perspective of a work station or other computing device, seeking to access such server data is much slower than access to data on a local storage device. The embodiments described herein provide a more efficient technique for accessing data through network interconnections.

The embodiments described herein provide an access control mechanism invoked during the establishment of a relationship between a client and the storage appliance. Under the access control mechanism there are no further access controls or checks. In one embodiment, each logical unit of the storage appliance is exposed as an independent target. The access control mechanism uses a shared secret for access to each logical unit and does not rely on knowledge of the client's identification. In essence, a client knowing the shared secret, will be granted access to a corresponding logical unit, irrespective of whether the client is known or unknown. As the storage appliance only needs to verify that the client knows the secret for the specific target or logical unit, there is no need for any knowledge of the client and the mapping table. In addition, under the embodiments described herein, the need for access control to be tested on each command is eliminated. The controlled discovery method also reduces the workload of the storage client during establishment and maintenance of connections to network devices, as each target discovered is intended for the client and there are no records that need to be filtered or otherwise discarded as irrelevant. This, in turn, reduces network traffic by limiting the amount of discovery information transferred from the broker of that information. Furthermore, the embodiments described herein place no additional burden on storage clients as discussed in more detail below.

FIG. 1 is a simplified schematic diagram illustrating iSCSI access control in accordance with one embodiment described in the present disclosure. Storage appliance 104 is in communication with hosts 100a and 100b over a storage area network. Hosts 100a and 100b may also be referred to as work stations or clients. Within each host 100a and 100b corresponding iSCSI initiator software exists thereon. The iSCSI initiator code 102a and 102b of the corresponding iSCSI initiator software will request access to certain volumes of storage pool 106. One skilled in the art will appreciate that if host 1-100a or host 2-100b sees a certain disc the corresponding host believes that it owns the disc exclusively. If nothing prevents two hosts from accessing the same disc in the same area, corruption may occur. In order to prevent corruption, access controls are provided as discussed further herein. Within storage appliance 104, storage pool 106 having volumes 106a and 106b, and access controls 110a and 110b, as well as targets 108a and 108b are provided. One skilled in the art will appreciate that volumes 106a and 106b are exposed as iSCSI targets 108a and 108b, respectively. Access controls 110a and 110b inform a corresponding initiator what that initiator can access in order to prevent access to unauthorized data. In essence, access controls 110a and 110b provide a list of iSCSI initiators that can access the targets and there is one access control for each target. In one embodiment, the list is a table of iSCSI qualified names (IQN), each of which is a globally unique identifier of the iSCSI initiator.

Figure 2:
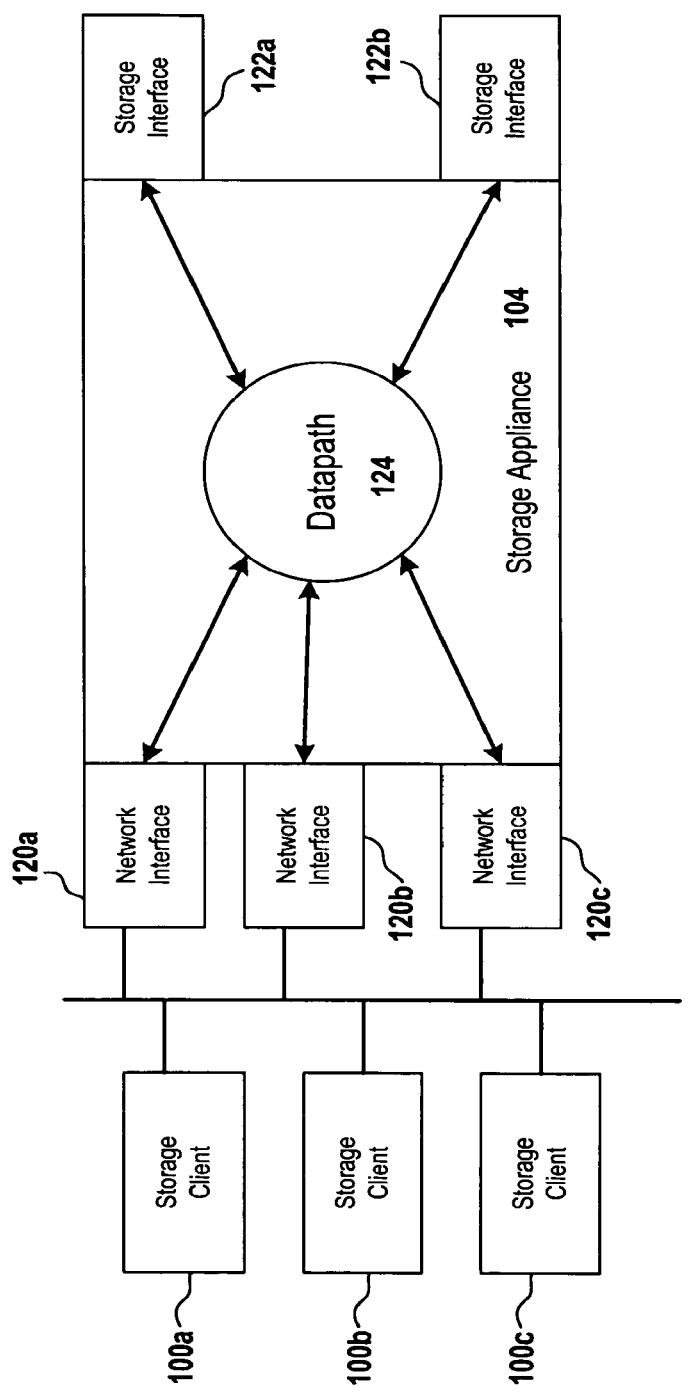
FIG. 2 is a simplified schematic diagram illustrating a storage device interfacing with a number of clients in accordance with one embodiment described in the to present disclosure.

FIG. 2 is a simplified schematic diagram illustrating a storage device interfacing with a number of clients in accordance with one embodiment described in the present disclosure. Storage appliance 104 is an apparatus with network interfaces 120a through to 120c, data path 124, and storage interfaces 122a and 122b. Network interfaces 120a through 120c are in communication with hosts 100a through 100c. Hosts 100a through 100c are provided access to storage devices, which may be virtual or physical, through the corresponding network interface, data path 124 and storage interface. Storage interfaces 122a and 122b may connect appliance 104 to physical storage devices, e.g., discs or RAID array devices. Data path 124 performs a number of functions including implementing layers of storage transport protocols, such as Ethernet, IP, TCP, iSCSI, FC layers 1-4, and ULP, target application layer protocols, such as those defined in SCSI application layer specifications, and translating storage requests to and from storage interfaces 122a and 122b.

Figure 3:
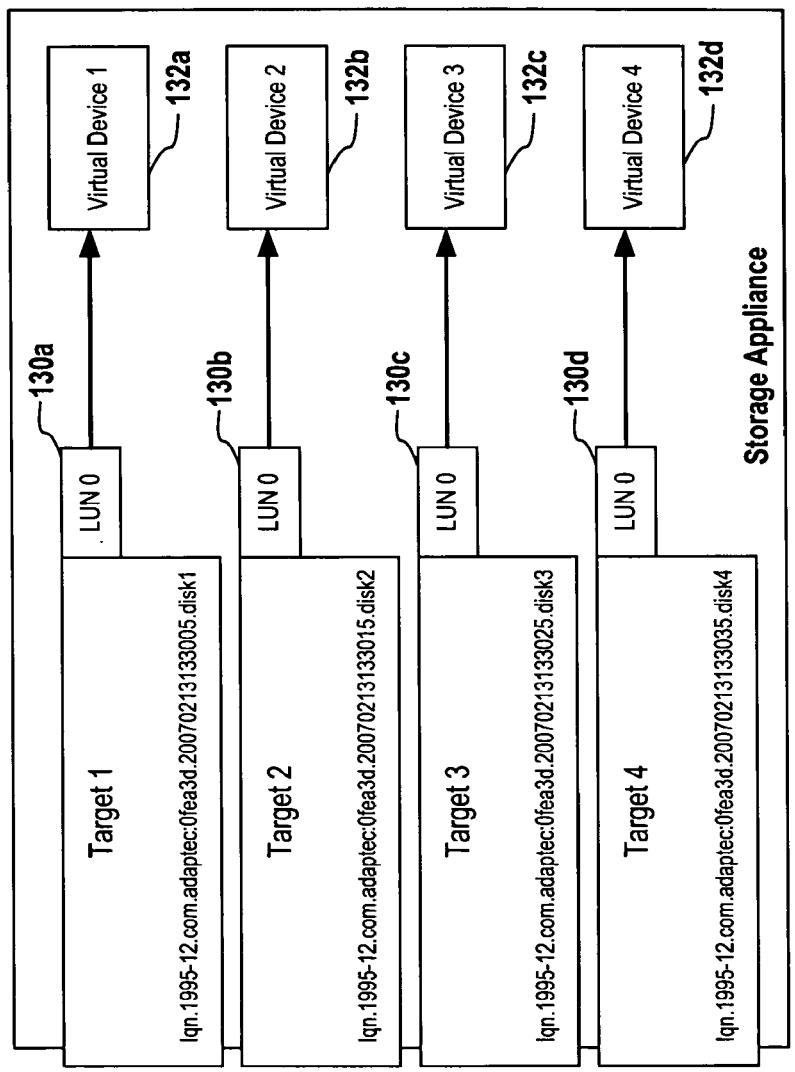
FIG. 3 is a simplified schematic diagram illustrating further details of storage appliance in accordance with one embodiment described in the present disclosure.

FIG. 3 is a simplified schematic diagram illustrating further details of storage appliance in accordance with one embodiment described in the present disclosure. Storage appliance 104 includes targets 108a through 108b which would be exposed to an initiator of FIG. 1. With each target 108a through 108d, a logical unit number (LUN) 130a through 130d is associated with each corresponding target. In one embodiment, storage appliance 104 is configured to present independent logical devices to the storage network via the network interfaces. Each logical device or volume appears in the storage network as an independent device. In order to access the associated storage, the storage clients perform a log-in or establish a relationship with each independent device. In the embodiments described below, a methodology is provided for the storage clients to access storage devices. In one embodiment, the storage appliance is configured such that only targets which the host initiator should be accessing are presented during discovery actions requested by the host. In another embodiment, storage appliance 104 maintains sufficient information about a target's, i.e., logical devices, and the intended clients or hosts for each target. As described above, this may be accomplished through the access control lists referred to in FIG. 1. The information within the access control list is used to register discovery information with discovery information brokers which may exist on the storage appliance or other storage network entity, in one embodiment. A Discovery Information Broker is an agent on the storage area network that presents discovered logical units to clients that have initiated a discovery request, in one embodiment. Changes to device configuration on the storage appliance will lead to an automatic update of registered information available by all discovery mechanisms. In this embodiment, the storage appliance is the agent of this update.

Two discovery mechanisms are presented herein for the iSCSI transport protocol in accordance with one embodiment described in the present disclosure. In one embodiment, the iSCSI discovery session is available to any storage client which knows the address of and has a physical path to any of the network interfaces on the storage controller. The discovery session requires the client to supply its identification. The client also requests a list of names and addresses of all targets on the storage appliance through the corresponding initiator. The iSCSI protocol specifies that the target is required to supply a list of all targets, all of which the initiator is authorized to access. In one embodiment, the storage appliance operates with no access controls based on the identity of the client, as all clients are effectively authorized to access all targets. In this embodiment, the intended client information is used to filter the list of targets returned to be only those that have been declared for use by the identified client.

Figure 4:
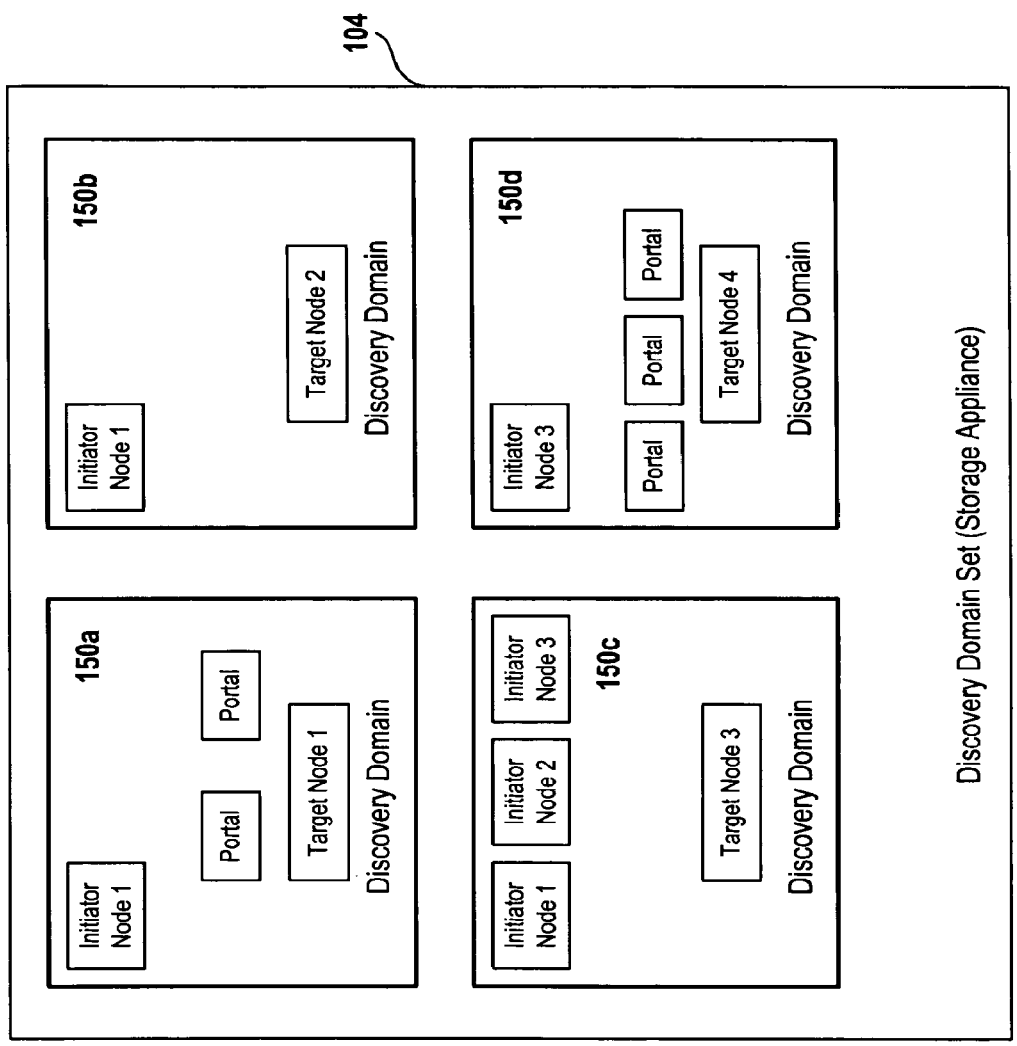
FIG. 4 is a simplified schematic diagram illustrating the discovery domains within a storage appliance in accordance with one embodiment described in the present disclosure.

FIG. 4 is a simplified schematic diagram illustrating the discovery domains within a storage appliance in accordance with one embodiment described in the present disclosure. Storage appliance 104 includes discovery domains 150a through 150d. It should be appreciated that a discovery domain is an object type defined and used to limit the information supplied to clients, which are referred to as initiator nodes. In one embodiment, discovery domains may be grouped together in a discovery domain set. Storage appliance 104 registers a discovery domain set for the appliance and a discovery domain for each target. As illustrated in FIG. 4, a discovery domain 150a through 150d corresponds with a respective target node 1-4. In addition, each discovery domain 150a through 150d registers an initiator node for each client it is intended to use. That is, initiator node 1 is allowed access to target node 1, target node 2, and target node 3. Initiator node 2 is allowed access to target node 3 while initiator node 3 is allowed access to target node 3 and target node 4. It should be noted that iSNS is a protocol designed to maintain and query a repository of target information for use by storage clients. In this embodiment, the storage appliance registers its target's names and addressing information with the iSNS server. Storage clients query this server to gain this information. This embodiment requires that the iSNS server is configured to allow DD/DDS modification by target nodes. The storage appliance can then register a DDS for the appliance, and a DD for each target. The storage appliance also registers an initiator node for each client in the DD of each target the client is intended to use.

In another embodiment, an access control mechanism that denies access to targets for which the client has not been configured to access is provided. It should be appreciated that the transport protocol used to access the targets must use connections which begin with a log-in procedure. The log-in procedure supports an authentication scheme in one embodiment. Each target on the storage appliance is configured to demand an authentication phrase. For example, iSCSI requires support for the challenge handshake authentication protocol (CHAP). The CHAP protocol requires a user name, which may be a target IQN and a secret, i.e., password. This storage appliance will only accept user name/secret pairs which are configured solely for the use of the target being logged into. In other words, the secret is uniquely indexed by each target-name/user name pair. In one embodiment, the user name may be set to the target. This reduces the information a client needs to retain as the target name in this secret. For example, if the target IQN 1995-12.com.adaptec: 0fea3d.20070213133015.disc2 is being accessed, the CHAP secret associated with user name IQN.1995-12.com.adaptec: 0fea3d.20070213133025.disc3 would not be accepted. If the host is unable to be authenticated, then the host is effectively denied access. In addition, once a client successfully logs in there are no further access checks needed for the duration of the connection. Thus, the access control mechanism presented herein is invoked during the establishment of a relationship between the client and the storage. Once this relationship is established, there are no further access controls or checks. With regard to earlier transport protocols having naming and addressing limitations with forced implementers to present a single target which the clients logged onto. The target then has zero or more logical units which each client may be allowed to access. The login described herein permits access to the storage appliance, (specifically one of its ports) but does not control access to the logical units, hence the need for a mapping technique. The method defined herein alters the use of the previous mechanisms to provide access control without knowledge of the identity of the client. That is, access control using mapping techniques requires the storage appliance to have prior knowledge of the identity of all clients. The use of a shared secret removes that requirement. Instead, the storage appliance only needs to verify the client knows the secret for the specific target. The storage appliance no longer needs any knowledge of the identity of the client.

Figure 5:
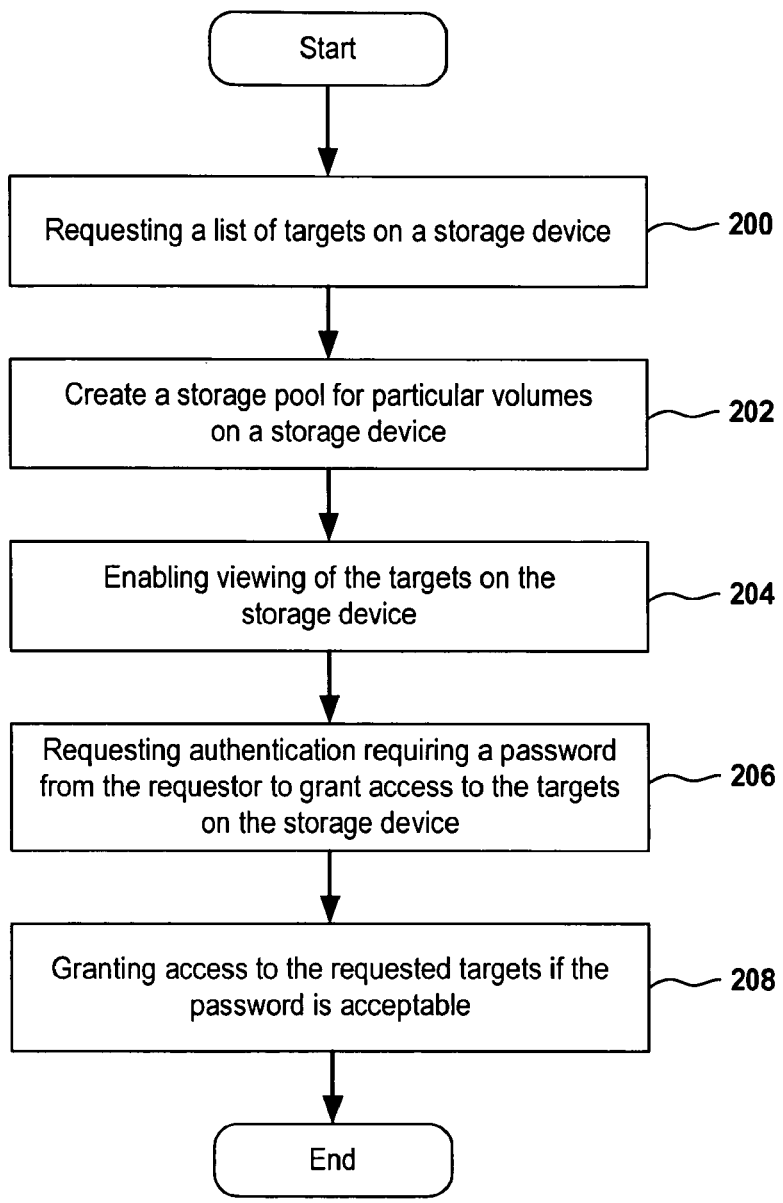
FIG. 5 is a simplified schematic diagram illustrating the method operations for a control discovery access in accordance with one embodiment described in the present disclosure.

FIG. 5 is a simplified schematic diagram illustrating the method operations for control discovery access in accordance with one embodiment described in the present disclosure. The method initiates with operation 200 where a host requests a list. With reference to FIG. 1, the host may request a list through an iSCSI initiator in one embodiment. In operation 202, a storage pool is created for particular volumes on a storage device, as illustrated in FIG. 1 in on exemplary embodiment. In operation 204 an initiator enables certain targets to be viewed. In one embodiment, the targets that are viewed are accessed through a login procedure that supports authentication as described above. In operation 206, authentication of the requestor requires the requestor to provide a username and password to the storage device in order to gain access to the viewed targets. The initiator accesses those targets through the successful authentication and password scheme described herein as specified in operation 208. Thus, through the above described controlled access mechanism the storage appliance verifies that the client knows the secret/password without knowledge of the client and the need for the mapping table is eliminated.

With the above embodiments in mind, it should be understood that several embodiments described herein may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of several embodiments are useful machine operations. Some embodiments described in the present disclosure also relate to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to to construct a more specialized apparatus to perform the required operations.

Various embodiments described in the present disclosure can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing embodiments have been described in some detail for purposes of clarity of understanding, it will be apparent that certain changes and modifications may be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A system comprising:
a target device; and
a storage appliance coupled to the target device, the storage appliance including:
a network interface for receiving a request from one of a plurality of client devices to access the target device;
a storage interface for accessing data from the target device; and
a datapath for implementing a storage transfer protocol to facilitate transfer of data between the client device and the target device, wherein the storage appliance is defined to determine which of the client devices has access to the target device based on a password, wherein to determine which of the client devices has access to the target device, the storage appliance is configured to determine whether the request includes a name of the target device and is defined to authenticate the password within the request without determining an identity of the one of the client devices, wherein the storage appliance is further defined to allow access to the target device upon determining that the request includes the name of the target device and that the password has been authenticated and without determining the identity of the one of the client devices.

2. The system of claim 1, wherein the target device includes a logic device, wherein the network interface is a medium for presenting the logical device to a storage area network.

3. The system of claim 1, wherein the request is generated from an iSCSI initiator code.

4. The system of claim 1, wherein the request is received after another request for a list of target devices on a storage area network is received.

5. The system of claim 1, wherein the target device includes a storage device, wherein the storage device is virtual or physical.

6. The system of claim 1, wherein the one of the client devices comprises a work station or a host device.

7. The system of claim 1, wherein the storage interface is configured to send the request to the data path for application of the storage transfer protocol.

8. The system of claim 1, wherein the storage transfer protocol comprises Ethernet, IP, TCP, iSCSI, FC layers 1-4, or ULP.

9. The system of claim 1, wherein the data path is configured to apply a target application layer protocol, wherein the target application layer protocol is defined in SCSI application layer specifications.

10. The system of claim 1, wherein the name includes an iSCSI qualified name (IQN) name.

11. The system of claim 1, wherein the password is a part of a challenge handshake authentication protocol (CHAP).

12. The system of claim 1, wherein the storage appliance is further defined to deny access to the target device upon determining that the password has not been authenticated.

13. The system of claim 1, wherein the storage appliance is configured to allow access to the target device without utilizing mapping techniques that use the identity of the one of the client devices.

14. The system of claim 1, wherein the password is uniquely indexed by the name of the target device.

15. The system of claim 1, wherein the target device comprises a storage device, wherein the storage device includes a disc or a RAID array device.

16. The system of claim 1, wherein the identity of the one of the client devices comprises an iSCSI qualified name (IQN) name of the one of the client devices.

17. A method comprising:
receiving a request from one of a plurality of client devices to access a target node;
determining which of the client devices has access to the target node based on a password, wherein said determining which of the client devices has access to the target node includes determining whether the request includes a name of the target node and whether the password of the request has been authenticated without determining an identity of the one of the client devices; and
allowing access to the target node upon determining that the request includes the name of the target node and that the password has been authenticated and without determining the identity of the one of the client devices.

18. The method of claim 17, further comprising denying access to the target node upon determining that the password has not been authenticated.

19. The method of claim 17, wherein allowing the access to the target node is performed without utilizing mapping techniques that use the identity of the one of the client devices.

20. A non-transitory computer-readable storage medium with an executable program stored thereon, wherein the program instructs a computer to perform the following operations:
receiving a request from one of a plurality of client devices to access a target node;
determining which of the client devices has access to the target node based on a password, wherein said determining which of the client devices has access to the target node includes determining whether the request includes a name of the target node and whether the password of the request has been authenticated without determining an identity of the one of the client devices; and
allowing access to the target node upon determining that the request includes the name of the target node and that the password has been authenticated and without determining the identity of the one of the client devices.

* * * * *